US012756763B2

(12) United States Patent

Kannembath et al.

(10) Patent No.: US 12,756,763 B2

(45) **Date of Patent: *Oct. 6, 2026**

(54) DEVICE RECOGNITION USING RECOGNITION IDENTIFIER

(71) Applicant: VISA INTERNATIONAL SERVICE ASSOCIATION, San Francisco, CA (US)

(72) Inventors: Manoj Kannembath, San Ramon, CA (US); Manjush Gopinatha Menon, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/455,594

(22) Filed: Jan. 21, 2026

(65) Prior Publication Data

US 2026/0156190 A1 Jun. 4, 2026

Related U.S. Application Data

(63) Continuation of application No. 18/681,821, filed as application No. PCT/US2022/040192 on Aug. 12, 2022, now Pat. No. 12,556,613.

(Continued)

(51) Int. Cl.

*H04L 67/146* (2022.01)

*G06Q 20/02* (2012.01)

(Continued)

(52) U.S. Cl.

CPC ........... *H04L 67/146* (2013.01); *G06Q 20/02* (2013.01); *G06Q 20/12* (2013.01); *G06Q 30/0601* (2013.01)

(58) Field of Classification Search

None

See application file for complete search history.

(56) References Cited

U.S. PATENT DOCUMENTS 11,107,080 B2 * 8/2021 Malik ................. H04L 63/0807

2016/0292682 A1 * 10/2016 Purves ................ G06Q 20/405

(Continued)

OTHER PUBLICATIONS

U.S. Appl. No. 18/681,821 , "Corrected Notice of Allowability", Jan. 13, 2026, 2 pages.

(Continued)

*Primary Examiner* — Jamie R Kucab

(74) *Attorney, Agent, or Firm* — Kilpatrick Townsend & Stockton LLP

(57) ABSTRACT

One embodiment of the present disclosure may include a method for providing access to resources by a resource provider computer during a first web session with a client device. The resource provider can provide a first web page to the client device, the first web page including a first option to complete a first access request with the resource provider computer as a guest for access to a first resource. The resource provider computer can receive a first selection of the first option from the client device and provide a second web page including a second option to remember the user device. The resource provider computer can, in response to receiving a second selection of the second option from the client device, send a remember flag to a server computer. The resource provider computer can then receive a recognition identifier from the server computer and store the recognition identifier.

20 Claims, 10 Drawing Sheets

Related U.S. Application Data

(60) Provisional application No. 63/233,183, filed on Aug. 13, 2021.

(51) Int. Cl.

| | |
|---|---|
| ***G06Q 20/12*** | (2012.01) |
| ***G06Q 30/0601*** | (2023.01) |

(56) References Cited

U.S. PATENT DOCUMENTS

| | | | | |
|---|---|---|---|---|
| 2017/0293915 | A1* | 10/2017 | Mattsson | G06Q 20/367 |
| 2017/0357976 | A1* | 12/2017 | Malik | H04L 63/0807 |
| 2019/0392431 | A1* | 12/2019 | Chitalia | G06Q 20/3674 |
| 2020/0065789 | A1* | 2/2020 | McCarthy | G06Q 20/20 |

OTHER PUBLICATIONS

U.S. Appl. No. 18/681,821 , Notice of Allowance, Mailed on Oct. 20, 2025, 14 pages.
"Payment Concepts: Credit Card Tokenization", Paylosophy, XP093417724, Available Online at: https://web.archive.org/web/20210730072008/https://paylosophy.com/payment-concepts-credit-card-tokenization, Jul. 30, 2021, 3 pages.
EP22856669.1 , "Summons to Attend Oral Proceedings", Jul. 27, 2026, 10 pages.

* cited by examiner

DEVICE RECOGNITION USING RECOGNITION IDENTIFIER

CROSS-REFERENCES TO RELATED APPLICATIONS

This application is a continuation application of U.S. application Ser. No. 18/681,821, filed Feb. 6, 2024, which is a 371 application of PCT application number PCT/US2022/040192, filed Aug. 12, 2022, which claims the benefit of U.S. Provisional Application No. 63/233,183, filed Aug. 13, 2021. These applications are hereby incorporated by reference in their entirety for all purposes.

BACKGROUND

For an e-commerce website, it can be more efficient to store information so a returning user can complete a transaction faster. However, not all returning users may necessarily create an account that stores their information in the e-commerce website. For example, they may use a guest checkout to do a transaction instead of creating and signing into a user account of the ecommerce website. In such cases, the users may need to fill out the same information (e.g., address, email, phone number, credit card information, etc.) for every transaction on the same ecommerce website, diminishing the quality of user experience.

Embodiments of the disclosure address this problem and other problems individually and collectively.

BRIEF SUMMARY

One embodiment of the present disclosure may include a method for providing access to resources by a resource provider computer during a first web session with a client device. The resource provider can provide a first web page to the client device, the first web page including a first option to complete a first access request with the resource provider computer as a guest for access to a first resource. The resource provider computer can receive a first selection of the first option from the client device and provide a second web page including a second option to remember the user device. The resource provider computer can, in response to receiving a second selection of the second option from the client device, send a remember flag to a server computer. The resource provider computer can then receive a recognition identifier from the server computer and store the recognition identifier on the client device.

Another embodiment of the present disclosure may include a method for providing access to resources by a resource provider computer during a second web session with a client device. The resource provider computer can receive a first selection of the first option from the client device for a second access request, fetch the recognition identifier from the client device, and send the recognition identifier to the server computer. The resource provider computer can then receive, from the server computer, account information of an account associated with the client device. The resource provider computer can provide resource information for a second resource to the server computer to complete the second access request These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

TERMS

Figure 1:
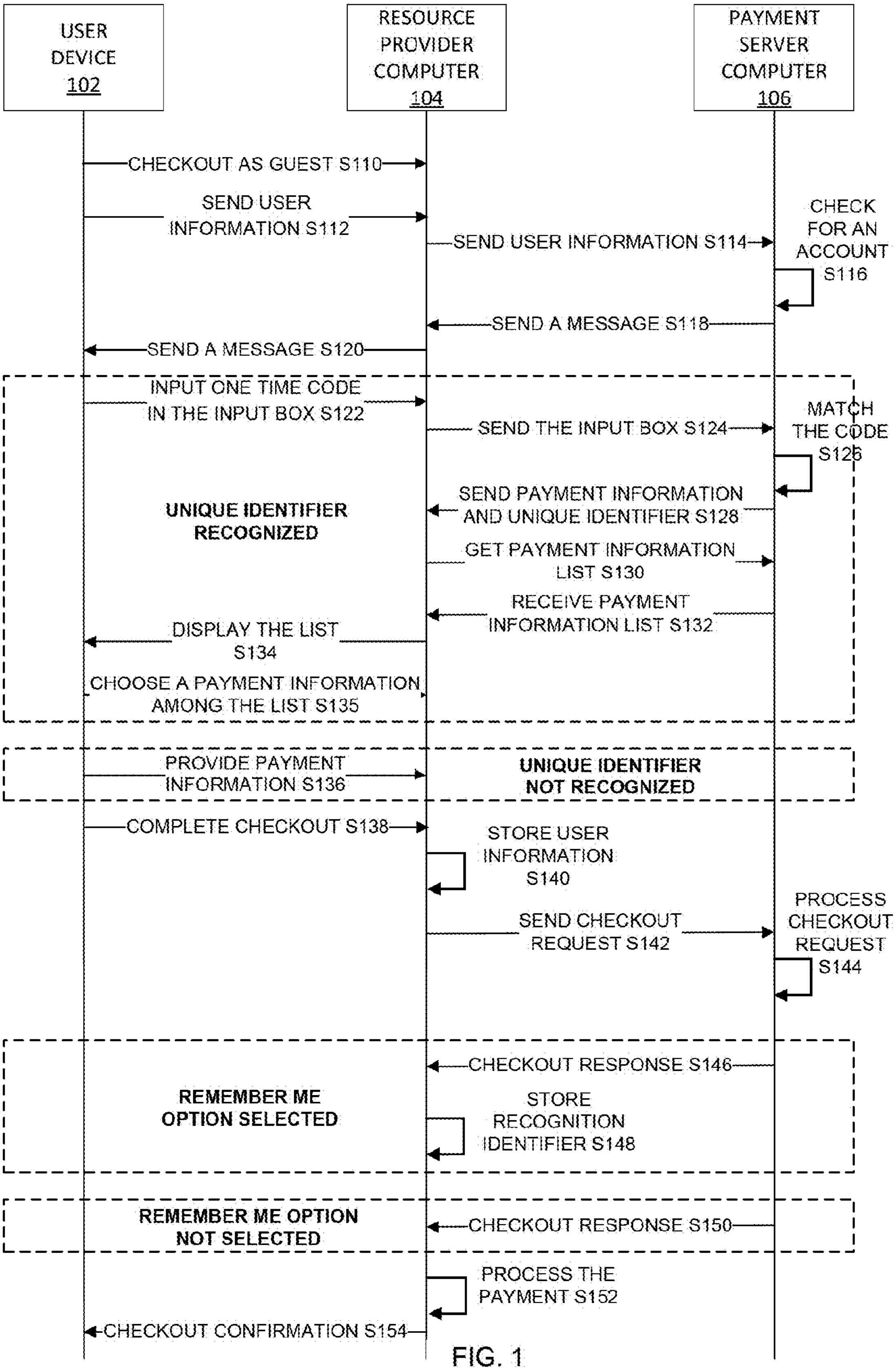
FIG. 1 is a sequence diagram showing a registration of a user device for being remembered in future web sessions with a resource provider according to embodiments of the present disclosure.

Prior to discussing specific embodiments of the invention, some terms may be described in detail.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

"Account credentials" may include any suitable information associated with an account (e.g. a account and/or portable device associated with the account). Such information may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

An "acquirer" may typically be a business entity (e.g., a commercial bank) that has a business relationship with a particular resource provider or other entity. Some entities can perform both issuer and acquirer functions. Some embodiments may encompass such single entity issuer-acquirers. An acquirer may operate an acquirer computer, which can also be generically referred to as a "transport computer."

An "authentication indicator" may be any suitable piece of data that provides additional proof that a particular circumstance is authentic. Exemplary authentication indictors may include cryptograms, flags, or other data which can indicate that a user was authenticated by a computing device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction.

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user. An issuer may also issue account credentials stored on a user device, such as a cellular telephone, smart card, tablet, or laptop to the user.

A "computing device" may include any suitable device that can electronically process data. Examples of computing devices include desktop computers, mobile devices or mobile computing devices, television sets, etc.

A "cookie" (aka, a "web cookie," "Internet cookie," or "browser cookie") may be any suitable piece of data sent from a webserver and stored on a user's computer. A cookie may be placed on a user's computer by the computer's web browser while the user is browsing a website maintained by the webserver.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "token" may be a substitute value for a credential. A token may be a string of numbers, letters, or any other suitable characters. Examples of tokens include tokens, access tokens, personal identification tokens, etc. A token may include an identifier for an account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, an account identifier (e.g., a primary account number (PAN)) may be tokenized by replacing the primary account identifier with a substitute number (e.g. a token) that may be associated with the account identifier. Further, tokenization may be applied to any other information that may be replaced with a substitute value. Tokenization may be used to enhance transaction efficiency, improve transaction security, increase service transparency, or to provide a method for third-party enablement.

A "token provider" or "token service system" can include one or more computers that service tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN and conducting a transaction using that PAN. In some embodiments, a token service system may include a tokenization computer alone, or in combination with other computers such as a transaction processing network computer. Various entities of a tokenization ecosystem may assume the roles of the token provider. For example, processing networks and issuers or their agents may become the token provider by implementing the token services according to embodiments of the present invention.

A "token vault" may refer to a repository that maintains established token-to-PAN mappings. According to various embodiments, the token vault may also maintain other attributes of the token requestor that may be determined at the time of registration and that may be used by a server to apply domain restrictions or other controls during transaction processing. The token vault may be a part of the token service system. In some embodiments, the token vault may be provided as a part of the server. Alternatively, the token vault may be a remote repository accessible by the server. Token vaults, due to the sensitive nature of the data mappings that are stored and managed in them, may be protected by strong underlying physical and logical security.

A "transaction" may be any interaction or exchange between two or more parties. For example, a transaction may include a first entity requesting resources from a second entity. In this example, the transaction is completed when the resources are either provided to the first entity or the transaction is declined.

A "transaction processing network," or "processing network," may refer to an electronic payment system used to accept, transmit, or process transactions made by payment devices for money, goods, or services. The processing network may transfer information and funds among authorization entitites (e.g., issuers), acquirers, merchants, and payment device users.

A "user" may include an individual. In some embodiments, a user may be associated with one or more personal accounts and/or mobile devices. The user may also be referred to as a cardholder, account holder, or consumer.

DETAILED DESCRIPTION

A user may use a guest checkout to perform a transaction in a merchant's e-commerce website instead of creating a user account. Since the user did not create the user account that stores user information such as address, phone number, credit card information, etc. in the merchant's (e.g., resource provider) database, the user who performs a guest checkout may need to provide user information every time the user performs a transaction as a guest in the merchant's e-commerce website.

In order to enhance the user experience for these guest checkouts, merchants can store user activity data in a user device to improve user experience. For example, cookie technology allows the merchant to store user information provided on its e-commerce website as a cookie. The merchant can then store the cookie in a web browser that the user uses to access the merchant's e-commerce website. Therefore, whenever the user uses the user browser to access the merchant's e-commerce website, the merchant's e-commerce website can use the cookie stored in the browser to access the user information in the e-commerce website. As an exemplary illustration, when a user uses a merchant's e-commerce website for the first time, the user may fill out its information for a transaction including name, email, phone number, etc. to perform a transaction. The merchant's e-commerce website can generate a first-party cookie to store such user information so that when the user comes back to the merchant's e-commerce website the second time, the cookie would provide the merchant's e-commerce website with all the user information.

Although the user information such as name, address, email, etc. can be stored in the user device (e.g., as a cookie) and be accessible by the merchant's e-commerce website, the merchant may not have access to the user's payment information due to security reasons. In a typical transaction, the merchant communicates with a payment server, which is of a separate entity from the merchant, to tokenize payment information, and the merchant uses the payment token provided by the payment server to perform the transaction. The payment server that has access to the payment information can generate a third-party cookie with the payment information and place the third-party cookie of the merchant's e-commerce website in the web browser such that when the user comes back to the merchant's website, the third-party cookie would help the payment server recognize the user and provide the payment information through the merchant's e-commerce website.

However, due to growing security and privacy concerns with the use of third-party cookie data, browsers can block the use of the third-party cookie. For example, some browsers have a default setting of blocking third-party cookie data. Many other browsers have an option of preventing a third-party cookie. In such cases, the payment servers are no longer able to place a third-party cookie in the merchant's e-commerce website, disabling the payment server from recognizing the user and providing the payment information.

Embodiments in this disclosure can solve this problem by having a merchant build a full checkout system where upon the user choosing to be recognized in a guest checkout, the merchant is able to communicate with the payment server directly such that the merchant can provide a unique identifier (e.g., email, phone number, etc.) to the payment server and in return would provide a recognition identifier (e.g., a recognition token). The recognition identifier can be stored in a first-party cookie format such that upon the user coming back for a second web session with the merchant's website, the merchant would be able to use the recognition identifier to identify the user, communicate with the payment server, and retrieve the payment information all without using the third-party cookie.

I. Registration

A user using a user device can be provided with an option to check out as a guest by a resource provider in a first web session. The website can be accessed by the user device using a web browser or a native application that interacts with a resource provider. Since this is the user's first web session and checking out as a guest, the resource provider may not have any user data regarding the user. Therefore, the user may need to enter user information and payment information in the first web session to perform a first transaction. Such information can be registered and stored in the user device after the first session.

A. Sequence Diagram

A user using a user device can select an option for the resource provider to remember payment information during a check out as a guest. The resource provider computer can register and store the user information and payment information such that the user device in future web sessions can be provided with the registered user information and payment information from the first web session by the resource provider.

FIG. 1 is a sequence diagram showing a registration flow of a user device for being remembered in future web sessions with a resource provider according to embodiments of the present disclosure. A user device 102, a resource provider computer 104, and a payment server computer 106 can be in operative communication with each other. The user device can also be a client device. Each dotted box represent different scenarios. For recognizing a unique identifier, steps S122 to S135 is when the user is recognized, and step S136 is when the user is not recognized. Steps S145 and S148 are when the user selects the remember me option, and step S150 is when the user doesn't select the remember me option. Further details to the scenarios are further explained in FIG. 1.

1. Start Checkout

A user of the user device 102 can finish looking at different items in a resource provider's website. The user can be provided with several options to check out. For example, the user can be provided with options of signing into an account or checking out as a guest. The user of the user device 102 can select a checkout option as a guest on the resource provider's site (e.g., a web page).

In step S110, the user device 102 can relay the check out as a guest information to the resource provider computer 104.

In step S112, the user device 102 can provide user information to the resource provider computer 104. The user information can include contact information (e.g., an email and/or phone number) and shipping information. Some user information can be used as a unique identifier (e.g., contact information) that can correspond with an account having payment information in the payment server computer 106.

In steps S114, the resource provider computer 104 can send the user information including the unique identifier to the payment server computer 106.

In step S116, the payment server computer 106 can use the unique identifier to check if there is a corresponding account with payment information stored in the payment server computer 106. The account can also include user information. If the unique identifier is not recognized by the payment server computer or does not correspond with an account, the payment server computer 106 can return a message indicating that the unique identifier does not correspond with any payment information. However, if the unique identifier is recognized by the payment server computer 106 to be corresponding with an account with payment information, then the payment server computer 106 can generate a code message with one-time code (via text message, application, email, etc.) to the unique identifier (e.g., email, phone number, etc.). The payment server computer 106 can then generate a message comprising an input box that can verify the one-time code and send it to the resource provider computer 104.

In step S118, the payment server computer 106 can send the message to the resource provider computer 104. Depending on the result of step S116, the message can be the input box or a message indicating that the unique identifier does not correspond with an account.

In step, S120, the resource provider computer 104 can send the message to the user device 102. If the user device 102 receives a message indicating that the unique identifier does not correspond with an account in the payment server computer 106, then the registration flow can be skipped to step S136. Otherwise, the registration flow can continue.

2. Unique Identifier Recognized

The unique identifier may be recognized by the payment server computer 106, in which the user device 102 would be provided with the message comprising the input box from the resource provider computer 104. An illustration of the unique identifier being recognized is further shown in FIGS. 4 and 5.

In step S122, the user device 102 can receive the input box. The user of the user device 102 may have received one-time code using the user device 102, or other devices that can interact with the unique identifier to access the one-time code. The user can then input one-time code in the input box, and send the input box with one-time code to the resource provider computer 104.

In step S124, the resource provider computer 104 can send the input box with one-time code to the payment server computer 106.

In step S126, the payment server computer 106 can compare the one time code generated in step S116 with the one-time code received from the user device 102.

In step S128, if the two codes match, then the payment server computer 106 can send payment information of the account that correspond to the unique identifier to the resource provider computer 128. The resource provider computer 128 can also send the unique identifier to the resource provider computer.

In step S130, the resource provider computer 104 can communicate with other payment server computers to access all accounts with payment information corresponding to the unique identifier. For example, the unique identifier can be an e-mail, and the resource provider computer 104 can communicate with other financial services (payment server computers) to extract credit cards (payment information) that are registered under the e-mail.

In step S132, the other payment server computers (represented as the payment server computer 106) can provide other payment information of all accounts corresponding to the unique identifier to the resource provider computer 104. The payment information provided by the payment server computer 106 and other payment server computers can be gathered as a list of payment information.

In step S134, the resource provider computer 104 can display the list of payment information to the user device 102.

In step S135, the user can choose a payment information among the list of payment information to use it for the checkout. The registration flow can be skipped to step S138 once the payment information is selected.

3. Unique Identifier Not Recognized

The unique identifier may not be recognized by the payment server computer 106, in which the user device 102 would be provided with the message indicating that the unique identifier does not correspond with any payment information. An illustration of the unique identifier being not recognized is further shown in FIGS. 2 and 3.

In step S136, since there were no accounts in the payment server computer 106 corresponding to the unique identifier, the user can provide payment information to the user device 102. The payment information can include card expiration date, PAN, CVV, etc. that can be used for a first transaction. The user device 102 can then send the payment information to the resource provider computer 104.

4. Complete Checkout

In step S138, the user device 102 can display a remember me option to have the user device remember the payment information. In some embodiments, the remember me option can also extend to remembering other user information such as contact and/or shipping. Once the user determines whether to select or not select the remember me option, the user can choose to complete checkout, and the user device 102 can notify the resource provider computer 104 of the checkout and the selection of the remember me option.

In step S140, the resource provider computer 104 can store the user information (e.g., contact information, shipping information, etc.) in the user device 102. For example, the resource provider computer 104 can store the user information in a browser of the user device 102, e.g., as a cookie. The stored user information can be retrieved by the resource provider computer 104 at a later time.

In step S142, the resource provider computer 104 can send a checkout request to the payment server computer 106. The payment server computer 106 can be part of a payment network (e.g., secure remote commerce). The checkout request can include a various information, such as resource information (e.g., to identify items, such as goods or services, in a transaction, a building to be accessed, or a computer to be accessed), a unique identifier (e.g., an email, phone number, etc.), transaction ID, consent for functionality, the chosen payment information (e.g., credit card), etc. In some embodiments, the checkout request can include user information (contact, shipping address, etc.). If the remember me option is selected, the selection can trigger the resource provider computer 104 to set a remember flag that the user has requested the remember me option. The resource provider computer 104 can then include the remember flag in the checkout request.

In step S144, the payment server computer can process the checkout request. If the remember me option is selected, the payment server computer 106 can store the remember flag in the account. If the payment server computer 106 does not have an account that corresponds to the unique identifier (unique identifier not recognized), the payment server computer 106 can generate an account and store the remember flag along with the provided payment information from step S138. Upon storing the remember flag, the payment server computer 106 can generate a recognition identifier (e.g., a recognition token) that links to the account. The account can store, in addition to the payment information, the user information including the unique identifier. If the remember me option is not selected, the payment server computer 106 does not store any information, and the registration flow can be skipped to step S150. Otherwise, the registration flow can continue.

5. Remember me Option

In step S146, the payment server computer 106 can provide a checkout response with the recognition identifier to the resource provider computer 104. The checkout response can additionally contain payment information such as last four digits of the PAN, approval message that determines whether the recognition identifier has been generated, user information (e.g., email, address, etc.), option to get encrypted payload that merchant can use, transaction ID, etc. The response can include other information as described herein.

In step S148, the resource provider computer 104 can store the recognition identifier in the user device 102. For example, the resource provider computer 104 can store the recognition identifier in a browser of the user device 102, e.g., as a cookie. As another example, the resource provider computer 104 can store the recognition identifier in a native application of the user device 102. Either way, the resource provider computer 104 can know where the recognition identifier is stored and retrieve it at a later time. The storing of the recognition identifier can be accomplished via the website, which includes software that is running on the user device 102 and is in communication with the resource provider computer 104. The website can be provided to a web browser or a native application. As an example, a native application can run on a mobile device and communicate with a designated network computer, such as the resource provider computer 104. Once the resource provider computer 104 stores the recognition identifier, the registration flow can be skipped to step S152.

In some embodiments, the recognition identifier can be stored in a storage that the payment server computer 106 can securely access or that can be accessed to send to the payment server computer 106. The recognition identifier can be stored in combination with a user device ID and a provider ID for retrieving when a particular device returns to a particular website. The storage can be in the user device 102, resource provider computer 104, payment server computer 106, or another third-party device. For example, the recognition identifier can be inside a storage of the resource provider computer 104 or of a third party providing such a service to the resource provider computer 104. One device/computer can later fetch the recognition identifier from another device/computer by using an API (e.g., using the user device ID and the provider ID) of the other device/computer and send it to the payment server computer 106.

In step S150, the payment server computer 106 can provide a checkout response without the recognition identifier to the resource provider computer. The checkout response can contain payment information such as last four digits of the PAN, approval message that determines whether the recognition identifier has been generated, user information (e.g., email, address, etc.), transaction ID, etc. Since the user did not select the remember me option, the payment server computer 106 may not store any user information and payment information. The checkout response can comprise payment information such as last four digits of the PAN, approval message that determines whether the recognition identifier has been generated, etc.

6. Checkout Response

In step S152, the resource provider computer 104 can process the payment. The payment can be processed various ways, such as the resource provider sending payment information to an acquirer computer, which communicates with a payment network to send payment information to an issuer computer. The issuer computer can authorize the payment, and such authorization response can be provided back to the merchant.

In step S154, the resource provider computer 104 can provide the user device 102 with a confirmation page. The confirmation page can confirm that the order has been placed with the user information provided in previous steps. The confirmation page can comprise the payment summary and a confirmation number to the order.

In this manner, the resource provider can control and host all the webpages provided to the user, while still allowing the user device to be recognized during a later web session, even when the user selects a guest checkout option, which can include any option that is not signing into an account with the resource provider.

B. UI for New User Device Without Payment Information

A user device can display a series of user interfaces provided by the resource provider to complete a checkout. A user may use the series of user interfaces to provide user information and payment information that are necessary to process a first transaction by the resource provider computer. A unique identifier corresponding to payment information may not be recognized by the payment server computer 106 (corresponding to step S136 of FIG. 1). Such a scenario is now addressed.

Figure 2:
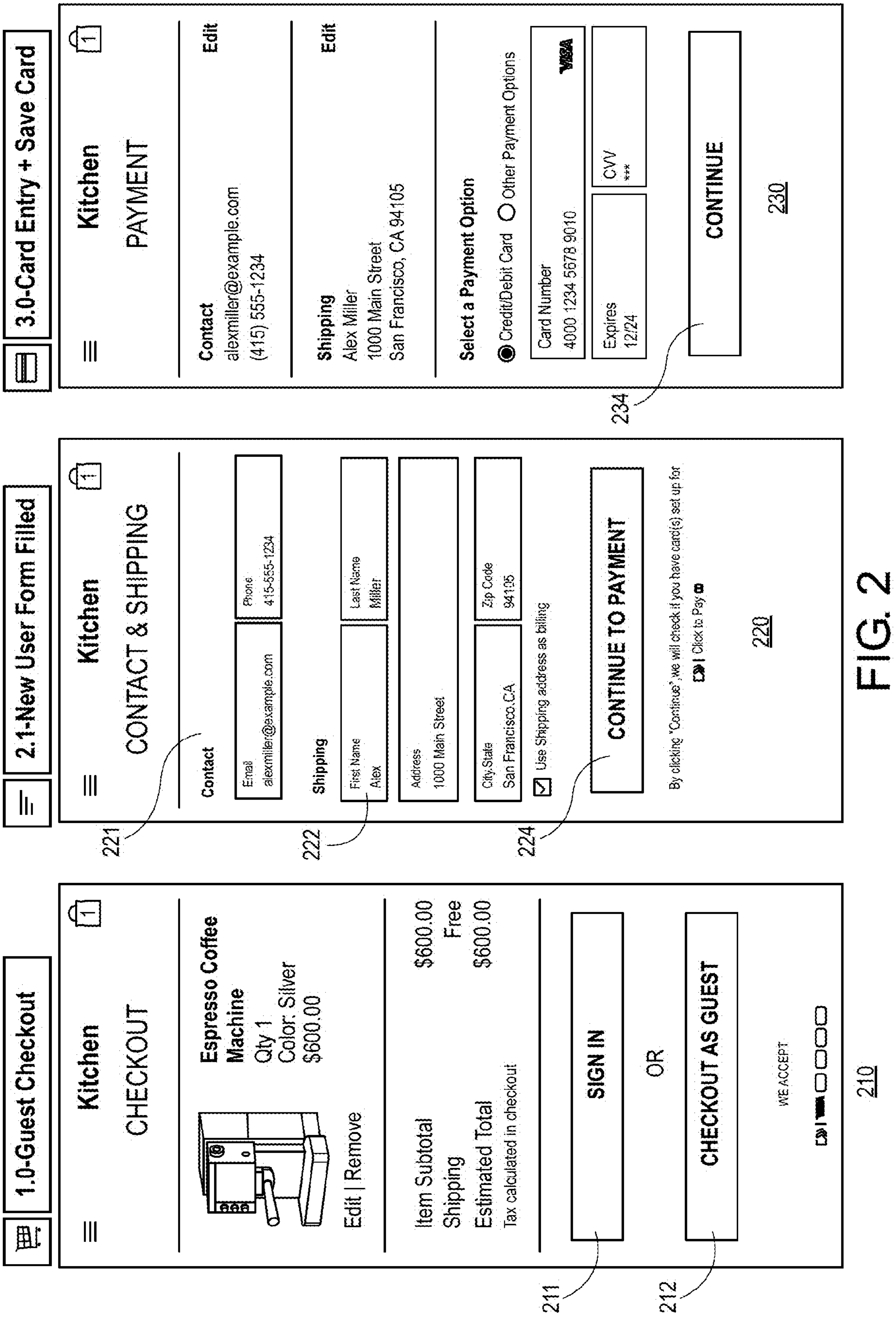
FIGS. 2-3 show a set of user interfaces at a new user device for performing a checkout at a resource provider and registering the user device for future transactions.
Figure 3:
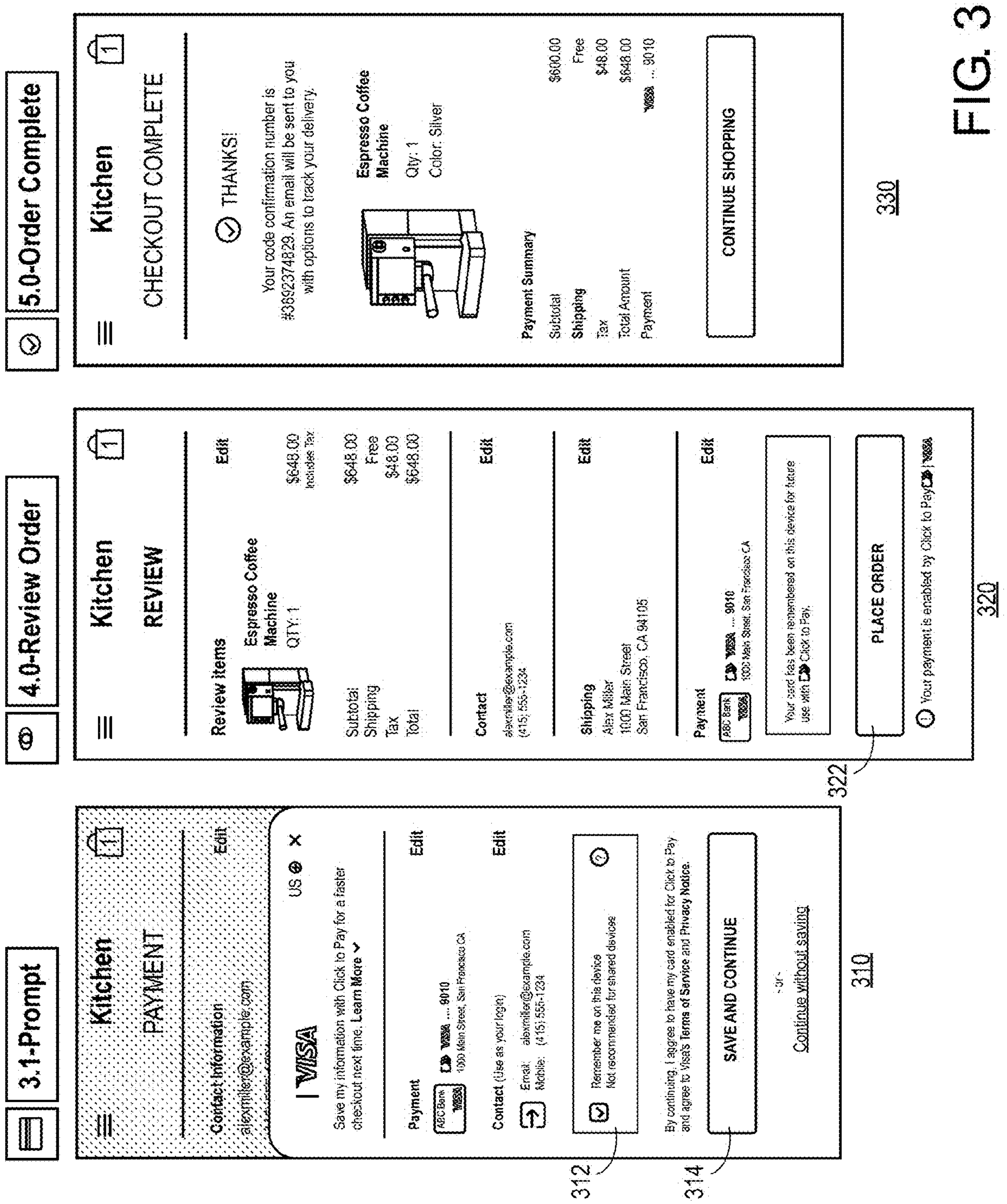

FIGS. 2-3 show a set of user interfaces at a new user device for performing a checkout at a resource provider's website and registering the user device for future transactions with the resource provider according to embodiments of the present disclosure. Pages 210-230 are shown in FIG. 2, and pages 310-330 are shown in FIG. 3. All the pages can be served by the resource provider computer, and not the payment server computer from FIG. 1.

At page 210, a checkout page can be provided, e.g., after the user has selected one or more items in a resource provider's website. The user may have two options in the checkout page: sign in option 211 and checkout as guest option 212. The sign in option 211 may enable a user with a user account to perform a transaction using the user account. The checkout as guest option 212 may enable a user to perform a transaction without signing into an account. The user may select the checkout as guest option 212. The operation performed in page 210 may correspond to step S110 of FIG. 1

At page 220, the user can provide user information such as contact information in contact input elements 221 and shipping information in shipping input elements 222. The contact information can be used as a unique identifier that is sent to the payment server computer. After filling in the user information, the user may select an option 224 to continue. The operation performed in page 220 may correspond to step S112 of FIG. 1.

After entering the user information and selecting the option 224 to continue, steps S114 to S120 can be performed. The unique identifier entered by the user in page 220 can be used by the payment server to check if there is an account with payment information that is linked to the unique identifier. In FIGS. 2 and 3, the payment server computer may not find an account having payment information that corresponds to the unique identifier. Therefore, the user can provide payment information to the resource provider.

At page 230, the user can have options of selecting credit/debit card or other payment options. The user may select credit/debit card and provide payment information (e.g., PAN, expiration date, etc.). After entering the payment information, the user may select an option 234 to continue. The operation performed in page 230 may correspond to step S136 of FIG. 1.

At page 310, the resource provider can provide an option 312 for saving the information with the payment server, e.g., as a click to pay option. This option can allow the user to re-use payment information. The resource provider can display a unique identifier (e.g., contact information) that can be linked with an account having the payment information in page 230 (described more in step S144 of FIG. 1). The user may select save and continue option 314. The operation performed in page 310 may correspond to step S138 of FIG. 1.

After selecting the option 312 to be remembered on the device and the option 314 to continue, steps S140 to S146 and step S152 of FIG. 1 can be performed.

At page 320, the user can review the items in the order. The user may be displayed with user information such as contact, shipping, and payment that the user has filled out prior to page 320. The user can then select the place order button 322. Upon selecting the place order button 322, an authorization request message can be sent to the issuer of the payment information like a normal transaction. The authorization request can be sent via standard network paths, e.g., through an acquirer and a payment network to an issuer computer that issued the credit card.

At page 330, the confirmation page showing the completed order can be displayed. The confirmation page can comprise the payment summary and a confirmation number to the order. The page 330 may correspond to step S154 of FIG. 1.

C. UI for New User Device With Payment Information

A user using a user device can be displayed with a series of user interfaces in the user device provided by the resource provider to complete a checkout. The user may use the series of user interfaces to provide user information including a unique identifier that are necessary to process a first transaction by the resource provider computer. The user device can be a returning user device that did not check an option to remember. The payment information can be provided by the resource provider upon recognizing the unique identifier.

Figure 4:
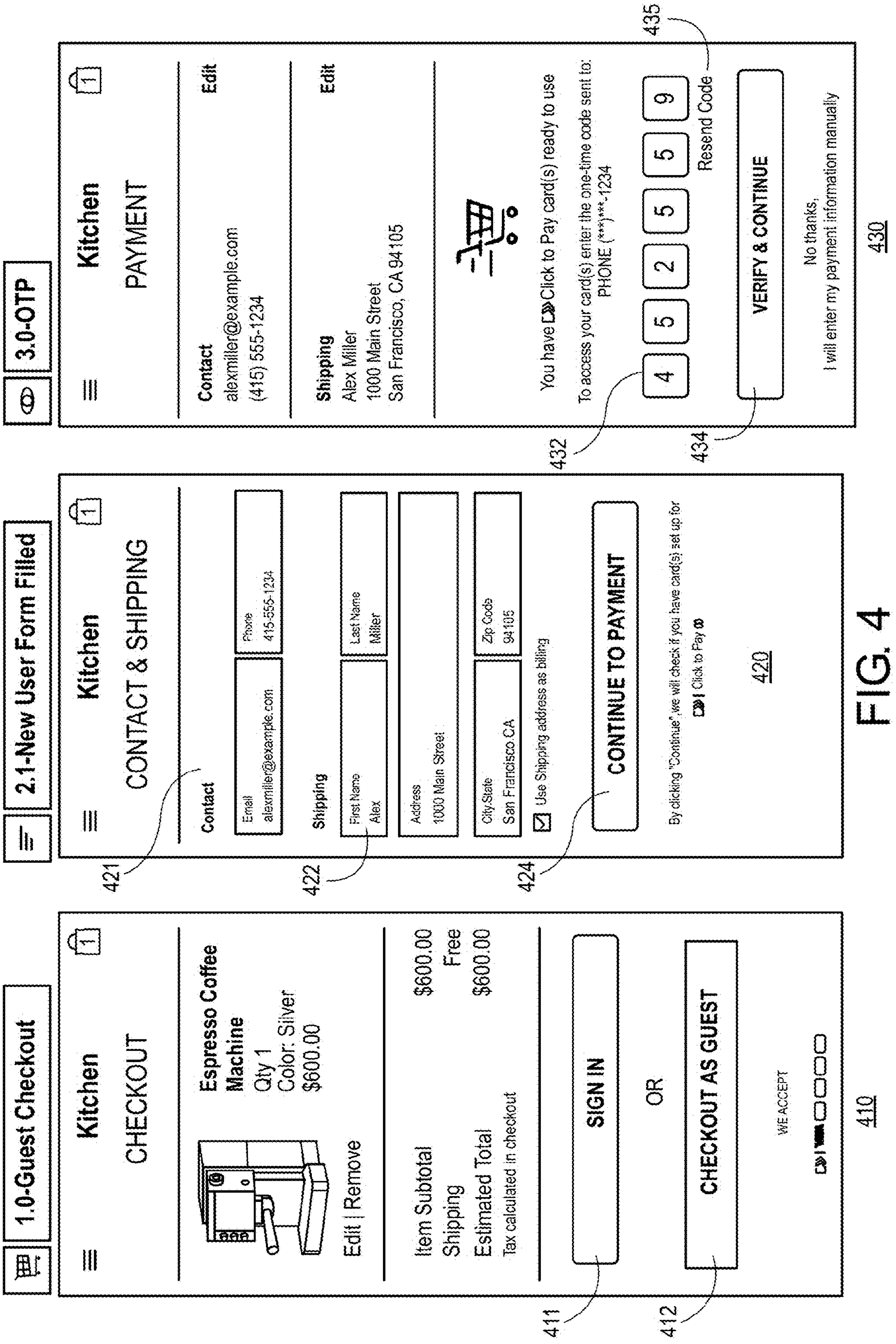
FIGS. 4-5 show a set of user interfaces at a returning user device for performing a checkout at a resource provider and registering the user device for future transactions by obtaining payment information through a unique identifier.
Figure 5:
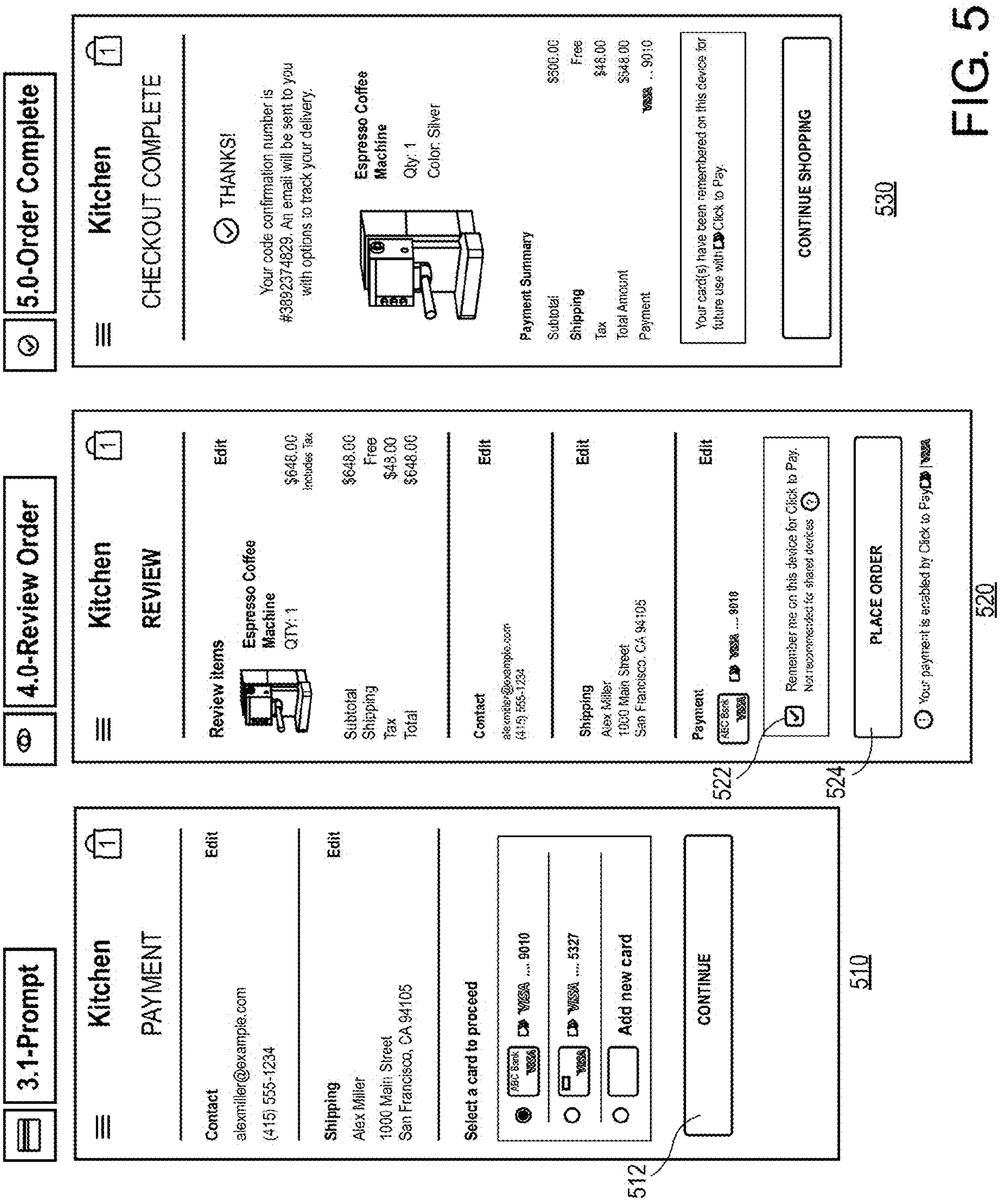

FIGS. 4-5 show a set of user interfaces at a returning user device for performing a checkout at a resource provider and registering the user device for future transactions according to embodiments of the present disclosure. The payment server computer may find an account with payment information linked to a unique identifier (e.g., contact information). Pages 410-430 are shown in FIG. 4, and pages 510-530 are shown in FIG. 5. All the pages can be served by the resource provider computer, and not the payment server computer from FIG. 1.

At page 410, the user can conclude looking at different items in a resource provider's website and be provided with a checkout page. The page 410 can be similar to page 210 in FIG. 2, and the descriptions of this page will not be repeated here. The operation performed in page 410 may correspond to step S110 of FIG. 1

At page 420, the user can provide user information such as contact information in contact input elements 421 and shipping information in shipping input elements 422. The contact information can be used as a unique identifier that is sent to the payment server computer. After filling in the user information, the user may select continue to payment option 424. The page 420 can be similar to page 220 in FIG. 2. The operation performed in page 420 may correspond to step S112 of FIG. 1.

After selecting the payment option 424 to continue payment, steps S114 to S120 can be performed. The unique identifier entered by the user in page 420 can be used by the payment server to check if there is an account having payment information that corresponds to the unique identifier. Upon finding the corresponding account with payment information, the payment server computer can generate a message with one-time code (via text message, application, email, etc.) to the unique identifier (e.g., email, phone number, etc.). The unique identifier may not necessarily be associated to the user device that is being used to check out. For example, if the unique identifier is a phone number, the payment server computer can send the one-time code via text message to the phone number. The phone number may be associated to a different device than the user device being used to check out items in the resource provider's website. The payment server computer can also generate an input box and send it to the user device.

At page 430, the user is asked to enter one-time code in the input box. The user may have received one-time code from the payment server via text message, application, email, etc. The user can input the one-time code in the input box, and select an option 434 to verify and continue. The user can have an option to receive a new code by clicking the resend code option 435. The operation performed in page 430 may correspond to step S122.

After selecting the option 434 to continue payment, steps S124 to S134 can be performed. The payment server can verify whether the one-time code entered in the input box corresponds to the one-time code generated by itself. Upon a valid verification, the payment server can return the payment information of an account and the unique identifier. The resource provider can communicate with other payment servers to obtain other accounts of payment information corresponding to the unique identifier. A list of payment information from the payment server and other payment servers can be returned to the user device.

At page 510, the user can have an option of selecting a payment information among the list of payment information. The user can choose the payment information that the user wants to use for the first transaction and click an option to continue. The operation performed in page 510 may correspond to step S135 of FIG. 1.

At page 520, the user can review the items in the order. The user may be displayed with user information such as contact, shipping, and payment that the user has filled out prior to page 520. The user may also be displayed with an option for saving the information with the payment server, e.g., as a click to pay option. Page 520 includes an option 522 to be remembered on the device. This option can allow the user to re-use payment information. The user can then select an option 524 to place order. The operation performed in page 520 may correspond to step S138 of FIG. 1.

After selecting the option 522 to be remembered on the device and the option 524 to continue, steps S140 to S148 and step S152 can be performed.

At page 530, the confirmation page showing the completed order can be displayed. The confirmation can comprise the payment summary and a confirmation number to the order. The page 530 may correspond to step S154 of FIG. 1.

II. Identification of Returning Device

A user of a user device may return for a second web session by a website provided by a resource provider computer. When the user device is at a check out page, the user device can recognize the website and provide payment information registered during a first web session. The user device can also provide user information such as contact information or shipping address necessary for a checkout.

A. Sequence Diagram

A user device can register payment information of a user during a first web session by a resource provider's website in the user device. The registered payment information can be used by the user device in future web sessions including a second web session whenever the user device accesses the resource provider's website.

Figure 6:
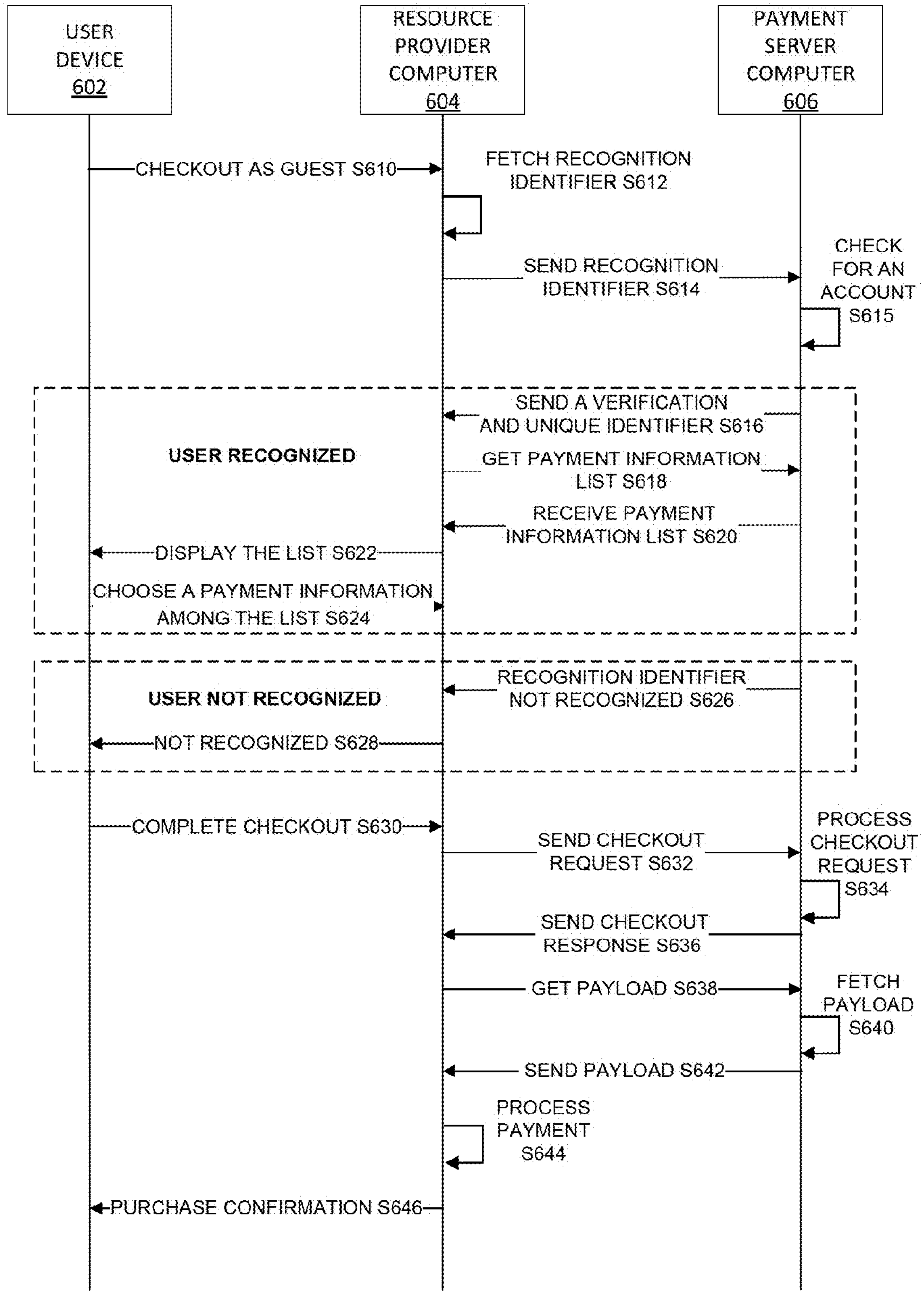
FIG. 6 is a sequence diagram showing a user device being remembered during a web session with a resource provider according to embodiments of the present disclosure.

FIG. 6 is a sequence diagram showing a user device being remembered during a web session with a resource provider according to embodiments of the present disclosure. A user device 602, a resource provider computer 604, and a payment server computer 106 can be in operative communication with each other. The user device can also be a client device.

1. Start Checkout

A user of the user device 602 can finish looking at different items in a resource provider's website. The user can be provided with several options to check out. For example, the user can be provided with options of signing into an account or checking out as a guest. The user of the user device 602 can select a checkout option as a guest on the resource provider's site (e.g., a web page).

In step S610, the user device 602 can relay the check out as a guest information to the resource provider computer 604.

In step S612, the resource provider computer 604 can fetch a recognition identifier that was previously saved (e.g., at step S144 of FIG. 1). The recognition identifier can be searched in a browser or native application of the user device, e.g., using the software downloaded as a website or using the native application. The resource provider computer 604 can provide instructions to the software running on the user device to perform such a search to see if any such recognition identifier exists. The recognition identifier can be stored with certain header information or metadata that indicates the data object is a recognition identifier that was stored in a registration process, such as described in FIG. 1. For example, the recognition identifier could be previously saved in a web browser as a cookie along with other user information, and provide the resource provider computer 604 with the cookie including the recognition identifier and user information when the user device 602 returns to the resource provider's website. In some embodiments, the resource provider computer 604 can fetch the user information stored by the first web session in step S140 of FIG. 1.

In step S614, the resource provider computer 604 can send the recognition identifier to the payment server computer 606.

In some embodiments, the recognition identifier can be fetched by the payment server computer 106 or fetched by a device (e.g., user device 102, resource provider computer 104, another third party device, etc.) to send to the payment server computer 106 depending on where the recognition identifier is stored. For example, one device/computer (e.g., resource provider computer 104) can later fetch the recognition identifier from another device/computer (e.g., third party device) by using an API (e.g., using the user device ID and the provider ID) of the other device/computer and send it to the payment server computer 106. A user device ID and a provider ID stored along with the recognition identifier can be used to retrieve the recognition token.

In step S615, the payment server computer 606 can check whether the recognition identifier is in its database. If the recognition identifier is recognized by the payment server computer 606, then the payment server computer 606 can fetch payment information of an account linked to the recognition identifier. The payment server can also fetch unique identifier (e.g., phone number, email address, etc.) stored in the account. In some embodiments, the payment server can fetch user information (e.g., contact or shipping) stored in the account.

If the recognition identifier is not recognized by the payment server, then the flow diagram in FIG. 6 can be skipped to step S626. Otherwise, the flow diagram in FIG. 6 can continue.

2. User Recognized

In step S616, the payment server computer 606 can send a verification that the recognition identifier is valid, the unique identifier, and the payment information of the account to the resource provider computer 604.

In step S618, the resource provider computer 604 can communicate with other payment server computers to access payment information of other accounts linked to the unique identifier. For example, the unique identifier can be an e-mail, and the resource provider computer 604 can communicate with other financial services (payment server computers) to extract credit cards (payment information) that are registered under the e-mail. In some embodiments, the payment server computer 606 can be the only payment server with an account of payment information registered under the unique identifier.

In step S620, the other payment server computers (represented as the payment server computer 606) can provide other payment information of all accounts corresponding to the unique identifier to the resource provider computer 604. The payment information provided by the payment server computer 606 and other payment server computers can be gathered as a list of payment information.

The payment information can include certain identifiers but not the complete account number. This information can be provided to the user so that it may select which payment option it wants to use. Thus, only enough information for the user to determine which card to use as needed.

In some implementations, steps S618 and S620 may not be needed. The payment server computer 606 can return payment information linked to the unique identifier directly. The resource provider computer 604 may not communicate with other payment server computers to access other payment information.

In step S622, the resource provider computer 604 can display the list of payment information to the user device 602.

In step S624, the user of the user device 602 can choose a payment information among the list of payment information that the user wants to conduct the transaction with, and send the choice to the resource provider computer 604. The flow diagram in FIG. 6 can be skipped to step S630 once the payment information is chosen.

3. User Not Recognized

In step S626, if the recognition identifier is not recognized, the payment server computer 606 can send a message to the resource provider computer 604 that the recognition identifier is not identified. The payment server computer 606 may not provide any payment information to the resource provider computer 604.

In step S628, the resource provider computer 604 can notify the user device 602 that the recognition identifier is not recognized by the payment server computer 606. To continue with the transaction, the user may go through the registration flow in FIG. 1.

4. Complete Checkout

In step S630, the consumer can select an option to complete the checkout. Upon selecting the option, a checkout request can be sent to the resource provider computer 604.

In step S632, the resource provider computer 604 can send the checkout request to the payment server computer 606. The checkout request can include various information, such as resource information (e.g., to identify items, such as goods or services, in a transaction, a building to be accessed, or a computer to be accessed), a unique identifier (e.g., an email, phone number, etc.), transaction ID, consent for functionality, the chosen payment information (e.g., credit card), user information (contact, shipping address, etc.), etc.

In step S634, the payment server computer can process the checkout request by checking that the information in the checkout request is valid.

In step S636, upon verifying that the information in the checkout request is valid, the payment server computer 606 can send the checkout response to the resource provider computer 604. The checkout response can contain payment information such as last four digits of the PAN, approval message that determines whether the recognition identifier has been generated, user information (e.g., email, address, etc.), transaction ID, option to receive an encrypted payload, etc.

In step S638, the resource provider computer 604 can request payload information, which can include additional credential information required to process the transaction. The payload information can comprise primary account number (PAN) or token number, expiration date, etc. In step S640, the payment server computer can review the request, and fetch the necessary credential information to complete the transaction. In step S642, the payment server computer 606 can send the payload information to the resource provider computer 604.

In step S644, the resource provider computer 604 can process the payment. The payment can be processed in various ways, such as the resource provider sending payment information to an acquirer computer, which communicates with a payment network to send payment information to an issuer computer. The issuer computer can authorize the payment, and such authorization response can be provided back to the merchant.

In step S646, the resource provider computer 104 can provide the user device 102 with a confirmation page. The confirmation page can confirm that the order has been placed with the user information provided in previous steps. The confirmation page can comprise the payment summary and a confirmation number to the order.

B. UI for Returning User Device

A user using a user device can be displayed with a series of user interfaces in the user device provided by the resource provider to complete a checkout. The user may navigate through a series of user interfaces to process a second transaction by the resource provider computer. The payment information and/or user information can be remembered by the resource provider computer instead of user providing them.

Figure 7:
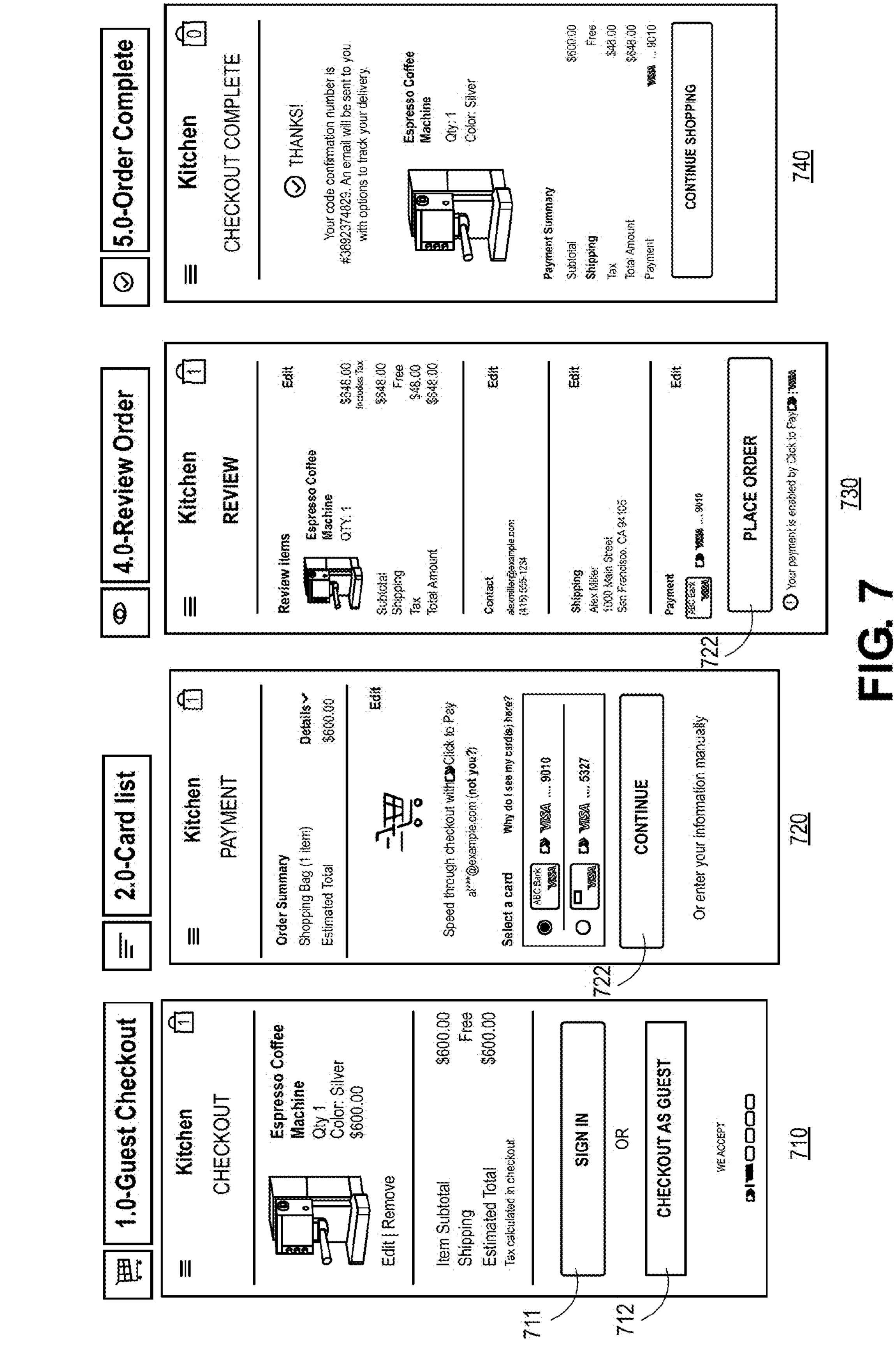
FIG. 7 shows a set of user interfaces at a returning user device for performing a checkout at a resource provider and being remembered according to embodiments of the present disclosure.

FIG. 7 shows a set of user interfaces at a returning user device for performing a checkout at a resource provider and being remembered according to embodiments of the present disclosure. Pages 710-740 are shown in FIG. 7. All the pages can be served by the resource provider computer, and not the payment server computer from FIG. 6.

At page 710, the user can conclude looking at different items in a resource provider's website and be provided with a checkout page. The user may be provided with two options: sign in option 711 and checkout as guest option 712. The sign in option 711 may enable a user with a user account to perform a transaction using the user account. The checkout as guest option 712 may enable a user to perform a transaction without signing into an account. The user may select the checkout as guest option 712. The operation performed in page 710 may correspond to step S610 of FIG. 6

After selecting the guest option 712 to check out as guest, steps S612 to S622 of FIG. 6 can be performed. The resource provider computer can fetch recognition identifier from the user device. The recognition identifier can be validated by the payment server, and can be used by the resource provider to obtain unique identifier, payment information, and/or user information of an account linked to the recognition identifier from the payment server computer. The resource provider can then communicate with other payment servers to obtain payment information of other accounts linked to the unique identifier. The list of payment information from the payment server and other payment servers can be returned to the user device.

At page 720, the user device can be displayed with a checkout page with user information and payment information completed. The user can select a payment information that the user wants to conduct transaction with among the list of payment information. The user can then select an option 722 to place order. The operation performed in page 720 may correspond to step S624 of FIG. 6

At page 730, the user can review the items in the order. The user may be displayed with user information such as contact, shipping, and payment of an account linked to the recognition identifier. The user can then select the option 722 to place order. The operation performed in page 730 may correspond to step S630 of FIG. 6.

Upon selecting the option 722, steps S632 to S644 of FIG. 6 can be performed. The resource provider computer can obtain additional payload information to conduct transaction, and send an authorization request message can be sent to the issuer of the payment information like a normal transaction. The authorization request can be sent via standard network paths, e.g., through an acquirer and a payment network to an issuer computer that issued the credit card. a confirmation that the order has been completed can be provided.

At page 740, the confirmation page showing the completed order can be displayed. The confirmation can comprise the payment summary and a confirmation number to the order. The page 740 may correspond to step S646 of FIG. 6.

Embodiments of the invention have a number of advantages. One advantage is that the resource provider now has a full control of user interfaces shown at the checkout page. The resource provider can provide payment information without the need for the payment server to be part of the user interface (e.g., without using the third-party cookie). Another advantage is that the users selecting an option for a guest checkout does not have to provide user information and/or payment information once registered, improving user experience with the resource provider's website.

III. Methods

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The first web session in FIG. 1 and the second web session in FIG. 6 may be carried out using the aspect methods disclosed in greater detail with reference to FIGS. 8 and 9.

A. Registering Device

Figure 8:
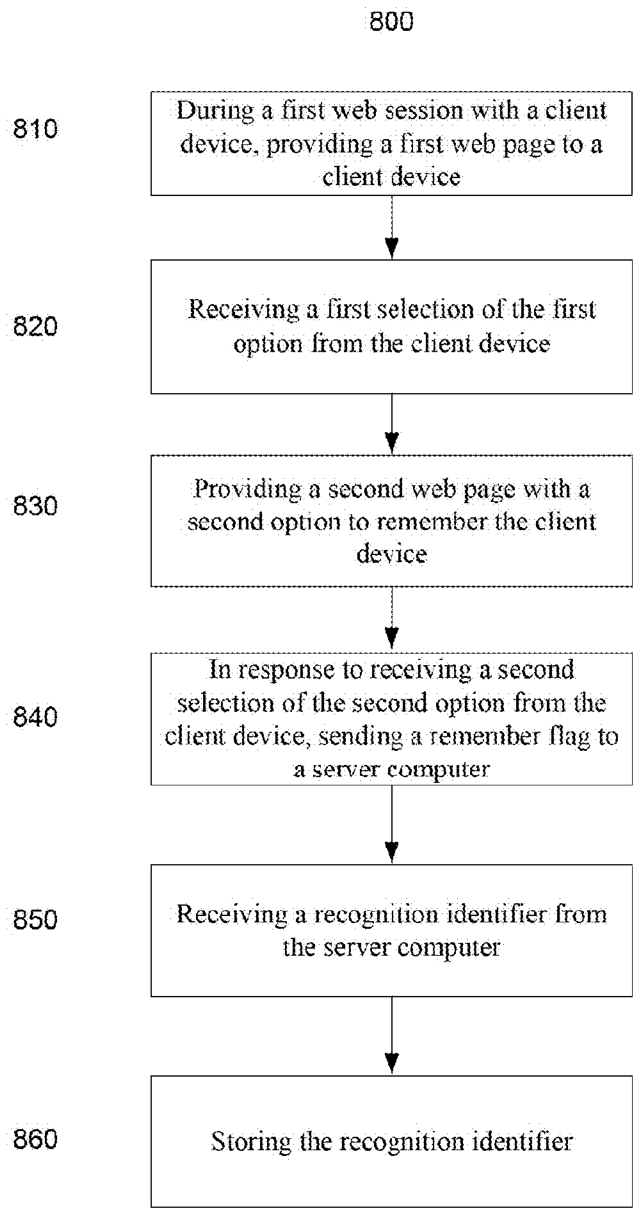
FIG. 8 is a flowchart illustrating a method for registering, during a web session by a website, a user device with a payment server according to embodiments of the present disclosure.

FIG. 8 is a flowchart illustrating a method 800 for registering, during a first web session by a website, a client device (e.g., a user device) with a server computer (e.g., a payment server computer) according to embodiments of the present disclosure. The first web session may be accessed with the client device via a browser or a native application that interacts with a resource provider computer. The first web session can correspond to FIGS. 1-5.

At block 810, the resource provider computer can provide a first web page to the client device, the first web page including a first option to complete a first access request with the resource provider computer as a guest for access to a first resource. The first web page can be provided after a user of the client device has finished viewing the first resource (e.g., items in the resource provider's website) and want to complete the first access request (e.g., a payment transaction). The first web page can also be provided with an option to sign in. Examples of the first web page can be seen in page 210 of FIG. 2 or page 410 of FIG. 4.

At block 820, the resource provider computer can receive a first selection of the first option from the client device. The first option can be completing the first access request as a guest. For example, checkout as guest option 212 can be selected in page 210 of FIG. 2 or checkout as guest option 412 can be selected in page 410 of FIG. 4. By selecting the first option, the user may need to provide necessary user information and payment information to continue with the first transaction to the resource provider computer.

At block 830, the resource provider computer can provide a second web page including a second option to remember the client device. Prior to displaying the second web page, the resource provider computer can provide a third web page with input elements to fill in user information to the client device. The user information can include contact information and shipping information. For example, contact input elements 221 and shipping input elements 222 in page 220 of FIG. 2 and contact input elements 421 and shipping input elements 422 in page 420 of FIG. 4 can be provided to the client device. In some embodiments, the user information can be stored in the client device (e.g., as a cookie in a web browser). The user information can also include a unique identifier. The unique identifier can be contact information such as an e-mail address and/or a phone number. The user information can then be sent from the client device to the resource provider computer, and from the resource provider computer to the server computer.

If the server computer has an account with payment information linked to the unique identifier, the server computer can generate a one-time code and an input box. The server computer can send the one-time code to the unique identifier and send a message with the input box to the resource provider computer. The resource provider computer can send the message to the client device. The user of the client device can enter the one-time code received through the unique identifier in the input box, and send the input box with the one-time code to the resource provider computer. The resource provider computer can send the input box with the one-time code to the server computer. The server computer can then verify the one-time code in the input box by comparing the one-time code in the input box with the generated one-time code. Upon a successful validation, the server computer can send the unique identifier and the payment information linked to the unique identifier to the resource provider computer.

The resource provider computer can then transmit the unique identifier to a plurality of server computers to receive a list of payment information. The list of payment information can include the payment information from the server computer and other payment information from the plurality of server computers. Upon receiving the list of payment information, the resource provider computer can provide the list of payment information to the client device. The client device can display the list of payment information to the user, and the user can choose a payment information among the list of payment information to complete the first access request. The client device can send the chosen payment information to the resource provider computer. The resource provider computer can then provide the client device with the second web page.

If the server computer does not have an account with payment information linked to the unique identifier, the server computer can send a message that the unique identifier is not linked to the account to the resource provider computer. The resource provider computer can send the message to the client device along with a fourth web page including input elements to fill in payment information. The client device can display the fourth web page to the user, and the user can fill in the input elements. The client device can then send the payment information to the resource provider to complete the first access request. Upon receiving the payment information, the resource provider computer can then provide the client device with the second web page.

At block 840, in response to receiving a second selection of the second option from the user device, the resource provider computer can send a remember flag to the server computer. The resource provider computer can additionally send a checkout request including the unique identifier and the payment information to the server computer. The checkout request can additionally include the user information and resource information. In some embodiments, the checkout request can include the remember flag. The server computer can then process the checkout request and the remember flag.

At block 850, the resource provider computer can receive a recognition identifier from the server computer upon processing the checkout request. The recognition identifier can be generated by the server computer, and can be linked with an account with payment information. If the payment server computer has an account linked with the unique identifier, then the recognition identifier can link with the account. Otherwise if the payment server computer does not have an account linked with the unique identifier, then the payment server computer can generate an account with the payment information given by a user of the user device, and link the generated account with the recognition identifier. The account can also store user information including the unique identifier.

At block 860, the resource provider can store the recognition identifier in various ways. One way to store the recognition identifier can be on the user device. For example, if the web page of the resource provider is opened using a web browser, then the recognition identifier can be stored as a cookie. In some embodiments, the recognition identifier can be stored in a storage that the payment server computer can securely access or that can be accessed to send to the payment server computer. The storage can be in the client device, resource provider computer, payment server computer, or another device The recognition identifier can be later used to fetch payment information and/or user information. Once the resource provider computer stores the recognition identifier, the resource provider computer can process the first access request.

B. Recognizing Device

Figure 9:
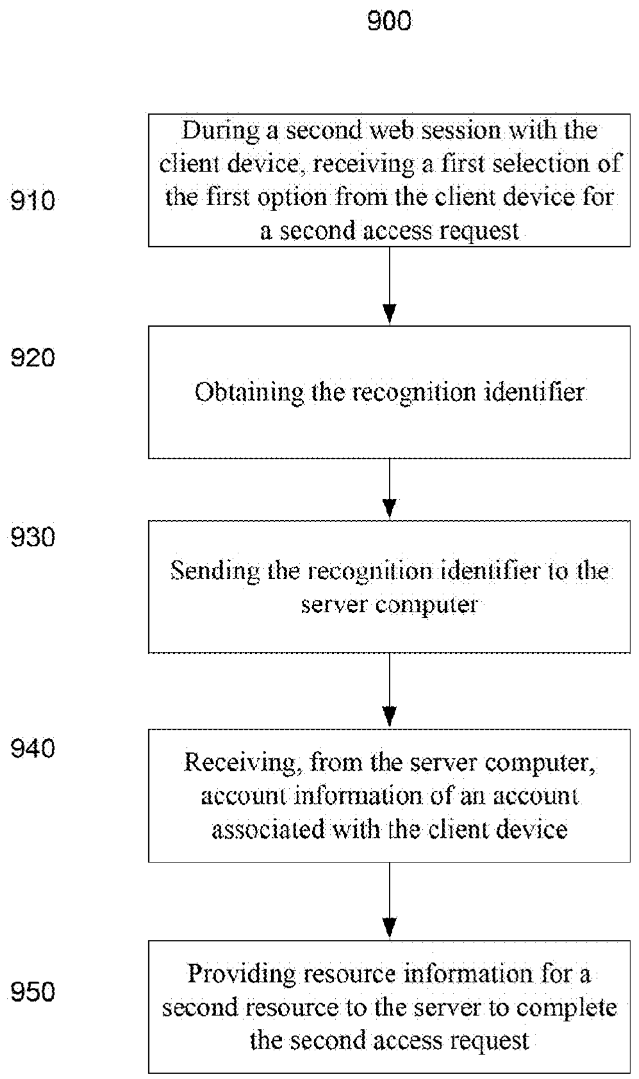
FIG. 9 is a flowchart illustrating a method for recognizing, during a web session by a website, a user device with a payment server according to embodiments of the present disclosure.

FIG. 9 is a flowchart illustrating a method for recognizing, during a second web session by a website, a client device (e.g., user device) with a server according to embodiments of the present disclosure. The second web session may be accessed via a browser or a native application that interacts with a resource provider computer. The second web session can correspond to FIGS. 6-7.

The resource provider computer can provide a first web page to the client device, the first web page including a first option to complete a second access request with the resource provider computer as a guest for access to a second resource. The first web page can be provided after a user of the client device has finished viewing the second resource (e.g., items in the resource provider's website) and want to complete the second access request (e.g., a payment transaction). The first web page can also be provided with an option to sign in. Examples of the first web page can be seen in page 710 of FIG. 7.

At block 910, the resource provider computer can receive a first selection of a first option from the client device for a second access request (e.g., payment transaction). The first option can be completing the second access request as a guest. For example, checkout as guest option 712 can be selected in page 710 of FIG. 7. The first web session and the second web session can be accessed by the same website provided by the resource provider. In the second web session, the user device can recognize the website and provide recognition identifier correlated to the website.

At block 920, the resource provider computer can fetch the recognition identifier. The recognition identifier can be obtained in various ways, depending on where the recognition identifier is stored. For example, if the recognition identifier is stored in one device/computer, another device/computer can fetch the recognition identifier by using an API of the other device/computer. The recognition identifier may have been stored through the first web session by the client device. The resource provider computer can obtain the recognition identifier, and can send the recognition identifier to a server computer (e.g., payment server computer). The server computer can use the recognition identifier to identify an account.

At block 930, the resource provider computer can send the recognition identifier to the server computer. The server computer, using the recognition identifier, can identify an account with account information stored from the first web session. The account information can comprise payment information and user information including a unique identifier provided by the user device in the first web session. In some embodiments, the server computer may not identify an account with account information linked to the recognition identifier. In such case, the payment server computer may not provide any payment information, and the user may need to fill out payment information similar to the first web session.

At block 940, the resource provider computer can receive, from the server computer, the account information identifying the account associated with the user device. The resource provider computer can transmit the unique identifier of the account information to a plurality of server computers to receive a list of payment information. The list of payment information can include payment information from the server computer and other payment information from the plurality of server computers. Upon receiving the list of payment information, the resource provider computer can provide the list of payment information to the client device. The user can then choose a payment information among the list of payment information to complete a second access request. The client device can then send the chosen payment information to the resource provider computer.

At block 950, the resource provider computer can provide resource information (e.g., item description) for the second resource (e.g., items in the resource provider's website) to the client computer to complete the second access request. The resource information can be part of a checkout request to the payment server computer 606. The checkout request can include various information., such as the resource information (e.g., to identify items, such as goods or services, in a transaction, a building to be accessed, or a computer to be accessed), a unique identifier (e.g., an email, phone number, etc.) and the chosen payment information (e.g., credit card).

The resource provider computer can validate the checkout request and send a checkout response back to the resource provider computer. The resource provider computer can additionally request payload information. The payload information can be additional credential information necessary to complete the second transaction. The payment server computer can then fetch and send the payload information to the resource provider computer. The resource provider having all the necessary information to perform the second transaction, can process the payment and send a confirmation page of order being placed to the user device.

IV. Computer System

Figure 10:
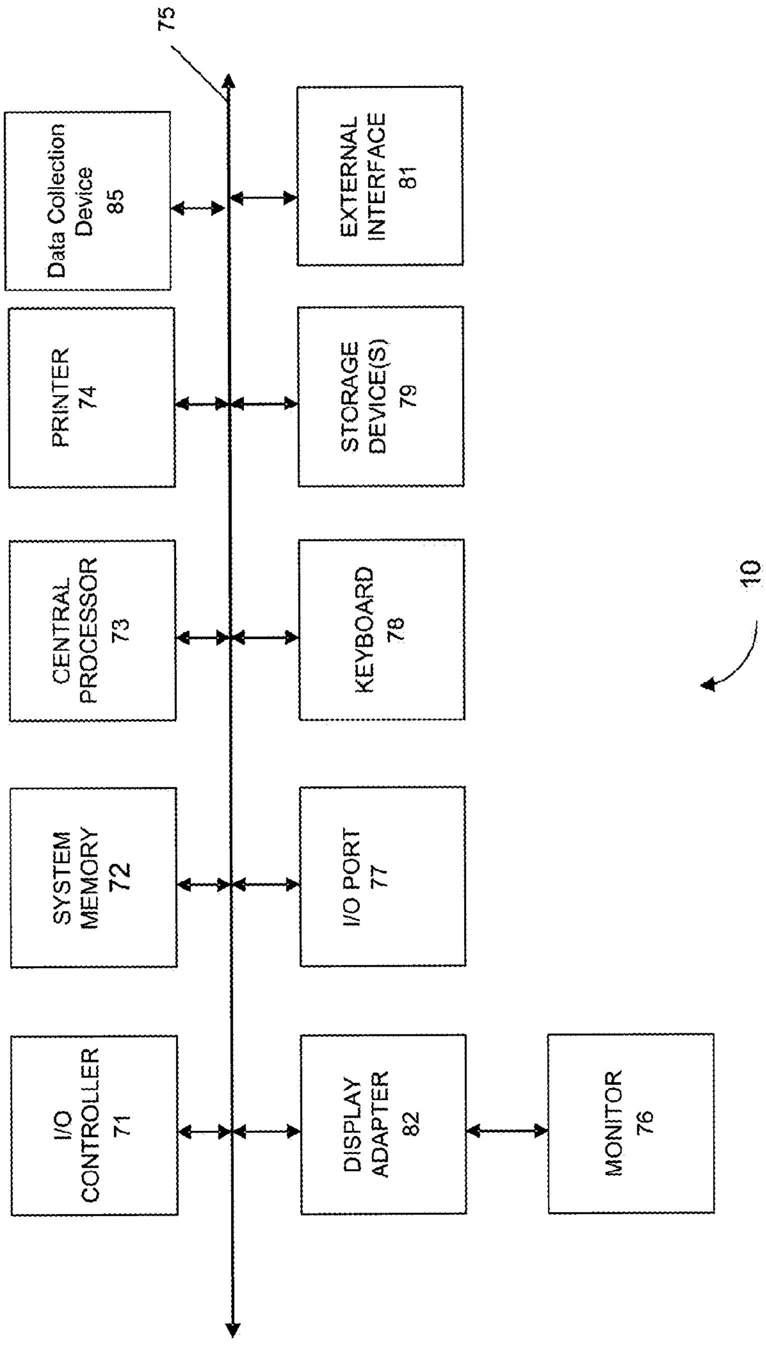
FIG. 10 shows a block diagram of an example computer system usable with systems and methods according to embodiments of the present disclosure.

Any of the computer systems mentioned herein may utilize any suitable number of subsystems. Examples of such subsystems are shown in FIG. 10 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 10 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk)

or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Any operations performed with a processor may be performed in real-time. The term "real-time" may refer to computing operations or processes that are completed within a certain time constraint. The time constraint may be 1 minute, 1 hour, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The claims may be drafted to exclude any element which may be optional. As such, this statement is intended to serve as antecedent basis for use of such exclusive terminology as "solely", "only", and the like in connection with the recitation of claim elements, or the use of a "negative" limitation.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method for providing access to resources, the method comprising performing, by a server computer:

during a first web session between a client device and a resource provider computer, the first web session corresponding to a first access request performed by the client device with the resource provider computer as a guest for access to a first resource:

receiving a remember flag from the resource provider computer, wherein the resource provider computer transmitted the remember flag responsive to a selection from the client device to remember the client device;

transmitting a recognition identifier to the resource provider computer;

receiving user information from the resource provider computer, the user information including a unique identifier associated with the client device, wherein the server computer has an account with payment information linked to the unique identifier;

during a second web session between the client device and the resource provider computer, the second web session corresponding to a second access request performed by the client device with the resource provider computer for access to a second resource:

receiving the recognition identifier from the resource provider computer;

identifying the unique identifier and the payment information based on the recognition identifier;

transmitting the unique identifier and the payment information to the resource provider computer, wherein the resource provider computer provides the payment information to the client device;

receiving resource information corresponding to the second resource from the resource provider computer; and causing the second access request to be completed responsive to receiving the resource information.

2. The method of claim 1, wherein the recognition identifier is stored in a browser or native application of the client device during the first web session, wherein the resource provider computer retrieves the recognition identifier from the browser or native application during the second web session prior to sending the recognition identifier to the server computer.

3. The method of claim 2, wherein the recognition identifier is stored as a cookie.

4. The method of claim 1, further comprising linking the recognition identifier to the account, wherein the step of identifying the unique identifier and the payment information based on the recognition identifier comprises:

checking whether the recognition identifier is stored in a database; and fetching the unique identifier and payment information from the account.

5. The method of claim 1, further comprising, during the first web session:

initially determining that there is no account associated with payment information linked to the unique identifier;

generating the account; and linking the account to the unique identifier.

6. The method of claim 5, further comprising, upon initially determining that there is no account associated with payment information linked to the unique identifier, transmitting a message to the resource provider computer that the unique identifier is not linked to the account.

7. The method of claim 5, wherein generating the account comprises:

receiving the payment information from the client device; and storing the payment information in the account.

8. The method of claim 7, wherein the server computer receives the payment information from the client device via the resource provider computer.

9. The method of claim 1, further comprising linking the remember flag with the account.

10. The method of claim 1, wherein the user information comprises contact information including an email address and/or a phone number.

11. The method of claim 10, further comprising:

generating a one-time code;

transmitting the one-time code to the email address and/or the phone number;

transmitting a message with an input box to the resource provider computer, wherein the resource provider computer provides the message and the input box to the client device;

receiving a received one-time code from the resource provider computer; and verifying the received one-time code by comparing it to the one-time code, wherein the step of transmitting the unique identifier and payment information to the resource provider computer is performed responsive to verifying the received one-time code.

12. The method of claim 11, further comprising identifying the email address and/or the phone number using the unique identifier.

13. The method of claim 1, wherein the resource provider computer additionally receives other payment information from one or more other server computers and provides the other payment information to the client device.

14. The method of claim 1, wherein causing the second access request to be completed comprises:

receiving a checkout request from the resource provider computer;

transmitting a checkout response to the resource provider computer;

receiving a request for payload information from the resource provider computer; and transmitting the payload information to the resource provider computer.

15. The method of claim 14, wherein the payload information includes additional credential information required to complete the second access request.

16. The method of claim 1, wherein causing the second access request to be completed comprises transmitting the payment information to an acquirer computer, wherein the acquirer computer communicates with a payment network to send the payment information to an issuer computer, wherein the issuer computer authorizes the second access request and generates an authorization response, wherein the authorization response is provided to the resource provider computer.

17. The method of claim 1, further comprising, during the first web session, transmitting the payment information to the resource provider computer, wherein the resource provider computer processes the first access request using the payment information and sends a checkout confirmation to the client device.

18. The method of claim 1, further comprising, during the first web session, causing the first access request to be completed by:

receiving a checkout request from the resource provider computer;

transmitting a checkout response to the resource provider computer;

receiving a request for payload information from the resource provider computer; and transmitting the payload information to the resource provider computer.

19. A server computer comprising:

a processor;

a network interface; and a non-transitory computer-readable medium comprising code for instructing the processor to implement a method for providing access to resources, the method comprising performing:

during a first web session between a client device and a resource provider computer, the first web session corresponding to a first access request performed by the client device with the resource provider computer as a guest for access to a first resource:

receiving a remember flag from the resource provider computer, wherein the resource provider computer transmitted the remember flag responsive to a selection from the client device to remember the client device;

transmitting a recognition identifier to the resource provider computer;

receiving user information from the resource provider computer, the user information including a unique identifier associated with the client device, wherein the server computer has an account with payment information linked to the unique identifier;

during a second web session between the client device and the resource provider computer, the second web session corresponding to a second access request performed by the client device with the resource provider computer for access to a second resource:

receiving the recognition identifier from the resource provider computer;

identifying the unique identifier and the payment information based on the recognition identifier;

transmitting the unique identifier and the payment information to the resource provider computer, wherein the resource provider computer provides the payment information to the client device;

receiving resource information corresponding to the second resource from the resource provider computer; and causing the second access request to be completed responsive to receiving the resource information.

20. The server computer of claim 19, wherein the user information comprises contact information including an email address and/or a phone number, and wherein the method further comprises:

generating a one-time code;

transmitting the one-time code to the email address and/or the phone number;

transmitting a message with an input box to the resource provider computer, wherein the resource provider computer provides the message and the input box to the client device;

receiving a received one-time code from the resource provider computer; and verifying the received one-time code by comparing it to the one-time code, wherein the step of transmitting the unique identifier and payment information to the resource provider computer is performed responsive to verifying the received one-time code.

* * * * *